United States Patent [19]
Venier et al.

[11] Patent Number: 5,587,580
[45] Date of Patent: Dec. 24, 1996

[54] OPTOELECTRONIC SENSOR FOR MEASURING THE INTENSITY AND THE DIRECTION OF INCIDENCE OF A LIGHT BEAM

[75] Inventors: Philippe Venier, Grenchen; Patrick Debergh, Cressier; Xavier Arreguit, Le Mont/Lausanne, all of Switzerland

[73] Assignee: CSEM Centre Suisse d'Electronique et de Microtechnique SA, Switzerland

[21] Appl. No.: 548,192

[22] Filed: Oct. 25, 1995

[30]  Foreign Application Priority Data

Oct. 25, 1994 [FR] France ................... 94 13046

[51] Int. Cl.⁶ ..................... H01J 40/14; G01B 11/26
[52] U.S. Cl. .................... 250/206.1; 250/208.2; 356/141.2
[58] Field of Search ............... 250/206.1, 206.2, 250/208.2, 203.3, 203.4, 203.6; 356/141.2, 152.1

[56]  References Cited

U.S. PATENT DOCUMENTS 5,319,188  6/1994  Cole ..................... 250/203.4

Primary Examiner—Edward P. Westin
Assistant Examiner—Kevin Pyo
Attorney, Agent, or Firm—Bacon & Thomas

[57]  ABSTRACT

The invention relates to an optoelectronic sensor for measuring the intensity and the direction of incidence of a light beam, the sensor being of the type comprising a matrix of pixels; an optical system designed to form a light spot on the matrix of pixels; and a signal process for determining the geometrical center of the light spot on the matrix, the signal processor constituted by two arrays of connections between the pixels of the matrix, substantially in radii and in concentric circles, the coordinates of the light spot on the matrix giving an image of the azimuth angle and of the elevation angle of the incident light beam, the device also including circuits associated with the two arrays of connections between the pixels to compute the azimuth and elevation coordinates respectively of the incident light beam.

11 Claims, 3 Drawing Sheets

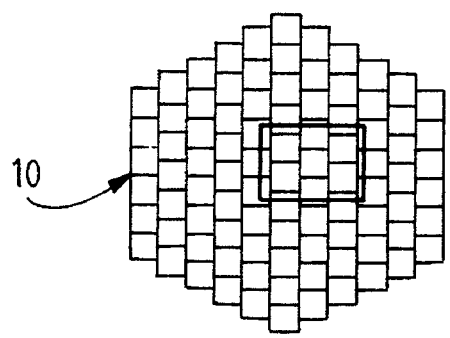
FIG. 3
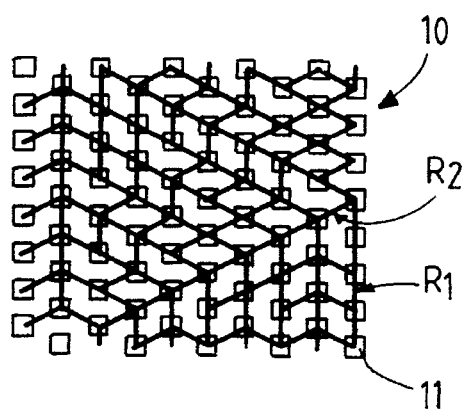
FIG. 4
FIG. 6
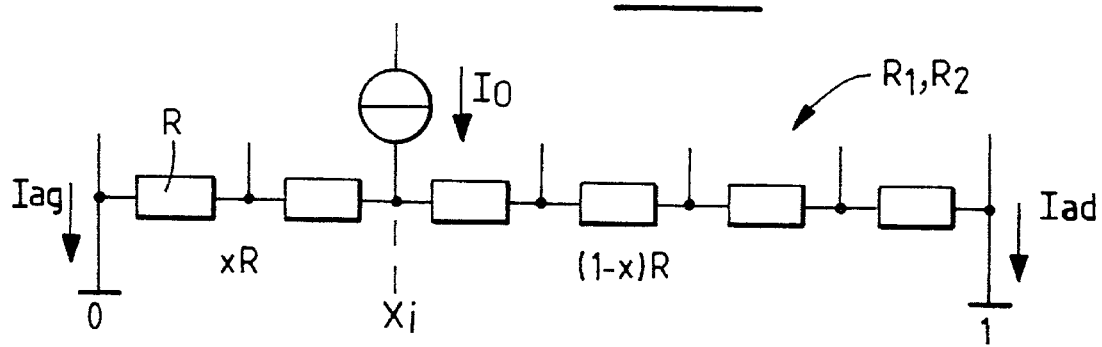

OPTOELECTRONIC SENSOR FOR MEASURING THE INTENSITY AND THE DIRECTION OF INCIDENCE OF A LIGHT BEAM

The present invention relates to the technical field of sensors enabling information carried by an incident light beam to be converted into electrical signals.

More precisely, the invention provides optoelectronic sensors suitable for measuring the intensity and the direction of incidence of a light beam (collimated or otherwise) coming from a source of any kind whatsoever.

BACKGROUND OF THE INVENTION

The present invention has a particularly advantageous application in the field of measuring the light flux emitted by the sun, so as to provide information to systems concerned with air conditioning, temperature regulation, controlling blinds, or home control in general, for example.

In the above preferred technical field, it has been found necessary to determine both the intensity of radiation from the sun and its direction of incidence in order to generate information suitable for use by various processing systems each adapted to a particular one of the intended applications. By determining the direction of incidence of light from the sun, it should be understood that both its azimuth angle and its elevation angle or angular height are measured. The design of such an optoelectronic sensor must therefore be such as to enable it to measure the direction of incidence of solar flux both when the sun is at its zenith and when it is close to the horizon. The sensor must also be designed to retain its measurement qualities even when placed in an environment that subjects it to stresses associated with temperature, moisture, or vibration, for example.

OBJECTS AND SUMMARY OF THE INVENTION

The invention therefore seeks to provide an optoelectronic sensor capable of determining the direction of incidence and the intensity of light flux, in particular from the sun, the measurement being performed over a wide range of variation with respect to the direction of incidence of the light flux.

The invention also seeks to provide a sensor designed to be suitable for use under difficult conditions, in particular with respect to moisture, temperature, or shock, while nevertheless being compact and of a design that limits its manufacturing cost and enables it to be mass-produced.

To achieve the above objects, the optoelectronic sensor of the invention comprises:

a matrix of pixels each including a photosensitive cell, the pixels being organized substantially in a plane so as to constitute an artificial retina;

an optical system designed to form a light spot on the matrix of pixels; and a signal processor device for processing the signals delivered by the pixels under the effect of a light beam and comprising:

means for determining the geometrical center of the light spot on the matrix, the position of which is a function of the direction of incidence of the light beam; and means for determining the intensity of the light beam.

According to the invention, the means for determining the geometrical center of the light spot are constituted by:

two arrays of connections between the pixels of the matrix, said arrays substantially constituting radii and concentric circles, the coordinates of the light spot on the matrix giving an image of the azimuth angle and of the elevation angle of the incident light beam; and circuits associated with the two arrays of connections between pixels respectively for calculating the azimuth coordinate and the elevation coordinate of the incident light beam.

BRIEF DESCRIPTION OF THE DRAWINGS

Various other characteristics appear from the following description given with reference to the accompanying drawings which show embodiments and implementations of the invention constituting non-limiting examples.

FIG. 3 is an overall view showing how the cells making up an artificial retina are organized.

FIG. 4 is a view on a larger scale showing a detail of FIG. 3 and showing how the cells are interconnected.

FIG. 6 is a view showing a detail of the sensor of the invention.

MORE DETAILED DESCRIPTION

Figure 1:
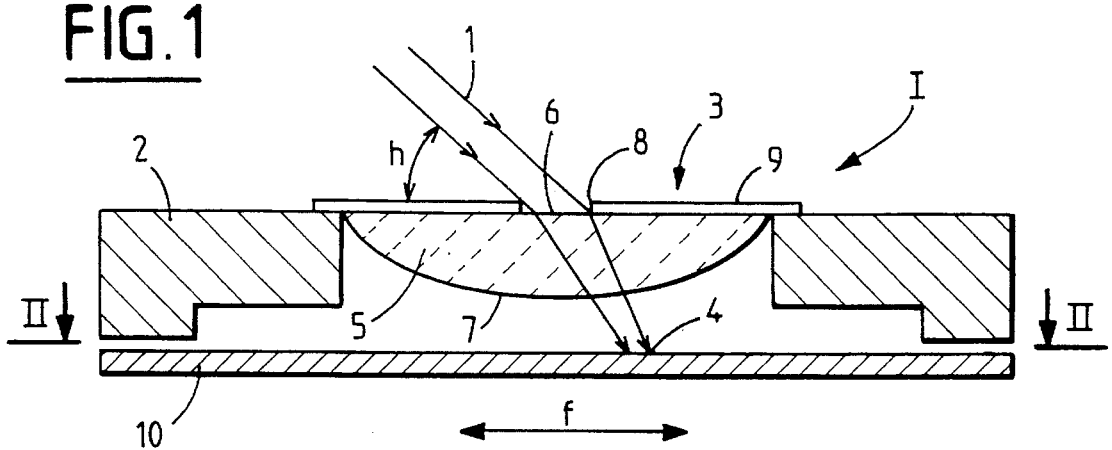
FIG. 1 is a diagrammatic cross-section showing the principle on which the optoelectronic sensor of the invention operates.
Figure 2:
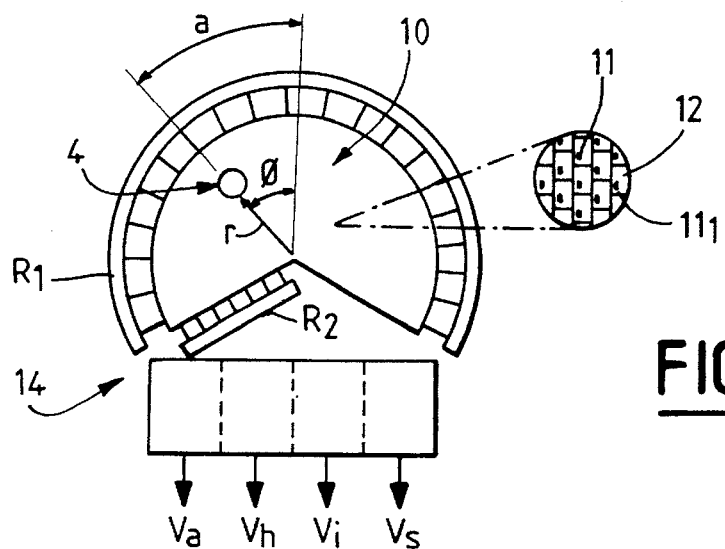
FIG. 2 is a diagrammatic plan view substantially on line II—II of FIG. 1.

As can be seen more precisely in FIGS. 1 and 2, a sensor I of the invention is suitable for measuring the intensity and the direction of incidence of a light beam 1 coming from a source which is constituted by the sun in a preferred embodiment of the invention. The sensor I is designed to measure the intensity and the direction of incidence of the light beam 1, i.e. its height or elevation angle h and its azimuth angle a which lies in a plane perpendicular to the sheet on which FIG. 1 is drawn.

The sensor I of the invention comprises a body 2 and an optical system 3 designed to reduce its angular aperture so as to form a light spot 4 from the incident light beam 1, regardless of the direction of incidence of the beam. In the example described below, the optical system 3 is constituted by a lens 5 having an inlet face 6 for the beam 1 and an outlet face 7 which, in accordance with the invention, is in the form of a spherical cap. In the example shown, the lens 5 is implemented in the form of a hemisphere. The optical system 3 also includes a diaphragm 8 formed in an opaque screen 9 designed to limit the outline of the light beam 1 penetrating the lens 5 via its inlet face 6. The diaphragm 8 is preferably circular in section.

According to another characteristic of the invention, the lens 5 is placed in such a manner as to cause the spherical cap 7 to be directed towards a matrix 10 of photodiodes or of photosensitive cells 11 each situated within a pixel 12. It should be understood that each pixel 12 comprises a cell 11 associated with electronics $11_1$ located in the vicinity of the cell. The matrix 10 thus constitutes an artificial retina made up of pixels 12 which together form a surface that extends in a plane. According to a characteristic of the invention, the vertex of the spherical cap 7 is situated at a distance from the matrix 10 which is determined in such a manner as to ensure that the matrix 10 is placed between the lens 5 and its focal plane f which is shown diagrammatically in FIG. 1. The distance between the lens 5 and the matrix 10, and the aperture of the diaphragm 8, together serve to determine the diameter of the light spot 4 that appears on the matrix 10. It should be considered that the spot 4 formed on the matrix should be of limited width so as to retain measurement resolution, but should be of sufficient width to cover a plurality of pixels so as to make it possible to determine the position of the spot on the array. Consequently, the spot 4 is unfocused and an image is not formed. Thus, the light spot 4 retains a diameter that is practically constant for all angular heights of the sun lying in the range 90° (which correspond to the sun being at its zenith) to 5° (which corresponds to the sun being positioned on the horizon). The optical system 3 thus reduces the angular aperture of height from an inlet range of 0° to 90° to an outlet range of 0° to 45°. By way of example, the diameter of the light spot 4 on the artificial retina 10 has a value of about 0.4 mm when:

the diaphragm 8 has a diameter equal to 0.48 mm;

the lens 5 has a refractive index equal to 1.5 and the radius of its hemisphere is equal to 1.6 mm; and the distance between the matrix 10 and the vertex of the lens is equal to 0.4 mm.

The optical system 3 thus makes it possible to concentrate the incident solar flux 1 onto an unfocused light spot 4 whose position on the matrix 10 varies linearly with the angular height of the sun. In the above-described example, the optical system 3 comprises a lens having a spherical cap and a diaphragm limiting the inlet aperture of the lens. Naturally, it is possible to envisage another embodiment of the optical system, constituted by a diffractive lens adapted to reduce the angular aperture so as to form a light spot on the matrix 10 regardless of the direction of the incident beam.

The pixels 12 of the matrix 10 are connected to a device 14 for collecting and processing electrical signals delivered by the pixels 12 in response to receiving a light flux. The device 14 is adapted to determine the position of the geometrical center of the spot 4 on the retina 10. The geometrical center of the light spot 4 is determined in polar coordinates, i.e. in the form of a distance r and an angle φ (FIG. 2) such that the polar coordinates r and φ correspond directly to the direction of the solar flux. The radial coordinate r of the position of the spot is practically proportional to the angular height h of the beam 1, whereas the angular coordinate φ corresponds directly to the azimuth angle a.

According to an advantageous characteristic of the invention, the device 14 is adapted to allocate a logical position expressed in polar coordinates to each cell 11 of the retina 10, thereby directly obtaining electrical signals that are proportional to the polar coordinates of the spot and thus to the direction of the incident flux 1. As can be seen more clearly in FIGS. 3 and 4, the matrix 10 comprises pixels 12 located in a compact hexagonal configuration compatible with the surface being completely filled. The pixels 12 are thus interconnected approximately in rows of coordinates in a polar frame of reference. The device 14 thus includes two arrays of connections for the pixels 12 suitable for approximating a polar frame of reference. Thus, a first array $R_1$ of connections between the pixels 12 is implemented substantially in concentric circles, more precisely approximated by concentric hexagons as a function of the positions of the pixels 12. The circles formed in this way in the array $R_1$ constitute rows of coordinates at constant radius. A second array $R_2$ of connections between the pixels 12 is also provided as a function of the locations of the cells in the form of radii which are approximated by staggered coordinate rows of constant argument. It should be observed that the direction of the light flux could be determined on the basis of Cartesian coordinates subsequently converted into polar coordinates.

Figure 5:
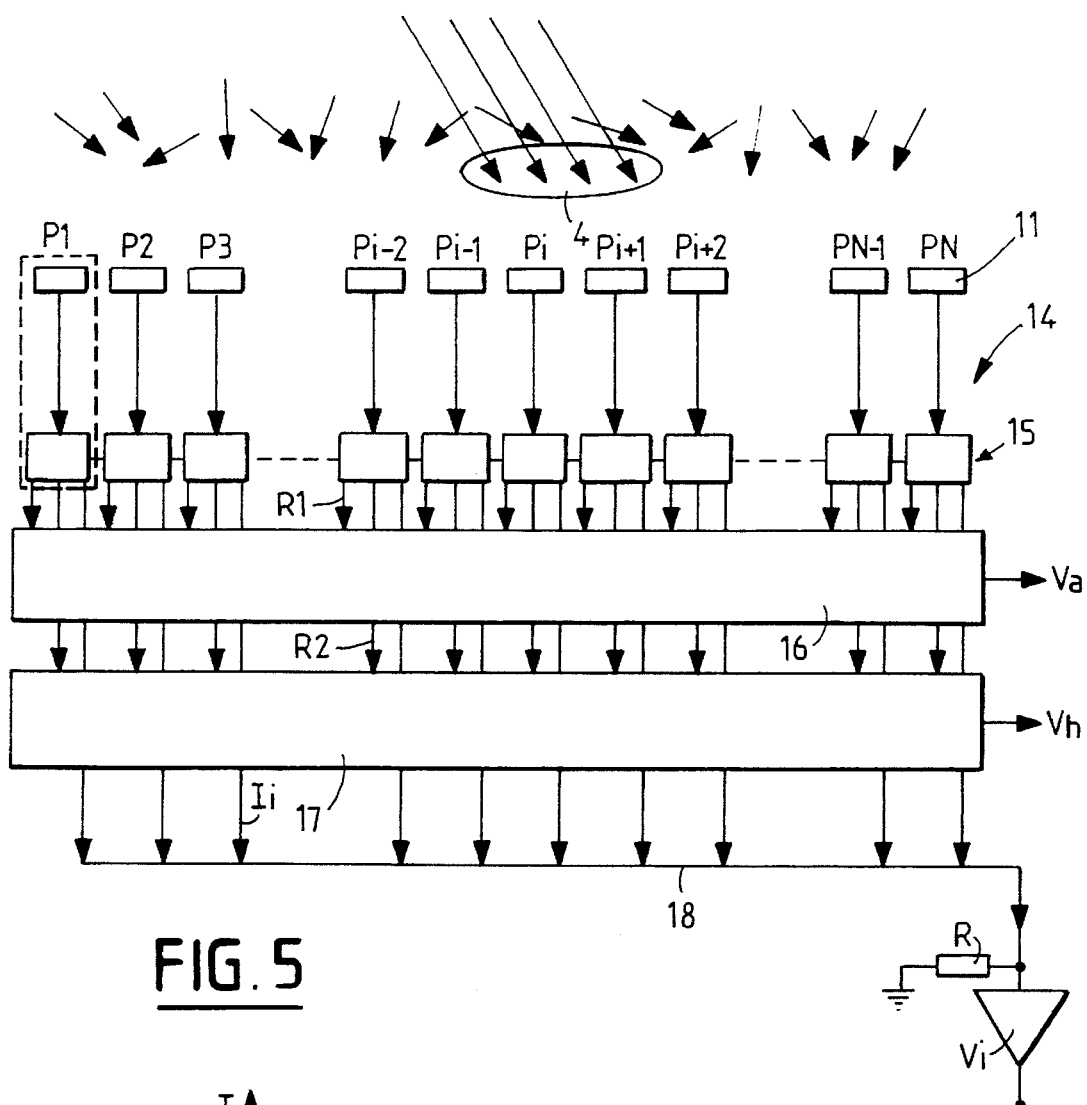
FIG. 5 is a functional block diagram showing a characteristic of the sensor of the invention.

It can thus be seen that each pixel 12 is connected to one of the rows in each of the arrays $R_1$ and $R_2$, one of which defines the radial position of the pixel while the other defines its angular position. When a pixel 12 is activated by a light flux, current is emitted simultaneously on each of the two corresponding rows in the arrays $R_1$ and $R_2$. To this end, the photocurrent from each of the cells 11, constituted by photodiodes, is processed by signal shaping means 15 (FIG. 5). The signal shaping means 15 are designed, for a given value of photocurrent, to generate a current $I_0$ of constant value on each of the arrays $R_1$ and $R_2$ (FIG. 6). Seen from outside the retina 10, the radial row and the angular row coordinates onto which a current is injected make it possible to specify the position of the illuminated cell directly in polar coordinates. Nevertheless, it should be observed that the spot 4 due to the light beam 1 covers a plurality of cells 11. The arrays $R_1$ and $R_2$ are thus connected to circuits 16 and 17 which are adapted to determine the geometrical center or center of gravity of the set of cells 11 that are illuminated by the spot 4.

The position of the light spot and of its center of gravity can be determined, for example, by the method described in the article by D. Standley entitled "An object position and orientation IC with embedded imager", published in IEEE Journal of Solid State Circuits, Vol. 26, No. 12, December 1991, and in the article by M. Tartagni and P. Perona entitled "Computing centroids in current mode technique", Electronics Letters, Vol. 29, No. 21, October 1993. By way of illustration, the ends of the radial rows $R_2$ and of the circular rows $R_1$ determining the polar frame of reference are connected to two chains of resistors R. Each node of the resistor chain corresponds to a discrete value given to the corresponding coordinate. Each active pixel 12 injects a unit current $I_0$ to the node situated at position xi which corresponds to the location of the cell. In the example shown, the position xi lies between the values 0 and 1, which correspond to the ends of each array $R_1$, $R_2$. When N pixels are active, the currents available at the ends are given by the following expressions:

$$I_{ag} = \sum_{i}^{N} (1 - xi) \cdot I_0$$

$$I_{ad} = \sum_{i}^{N} xi \cdot I_0$$

for the array $R_1$, and $$Ih_0 = \sum_{i}^{N} (1 - xi) \cdot I_0$$

$$Ih_{90} = \sum_{i}^{N} xi \cdot I_0$$

for the array $R_2$.

It should be considered that the terms xi may be interpreted as the positions of N elements of mass $I_0$. The center of gravity of these elements is obtained by dividing the above expressions by the sums of the masses, i.e. by a factor equal to $NI_0$. Insofar as the number N of active pixels is not constant, division is performed by means of current dividers. Thus, each of the circuits 16 and 17 delivers a single signal Va, Vh giving an explicit indication of the center of gravity.

Figure 7:
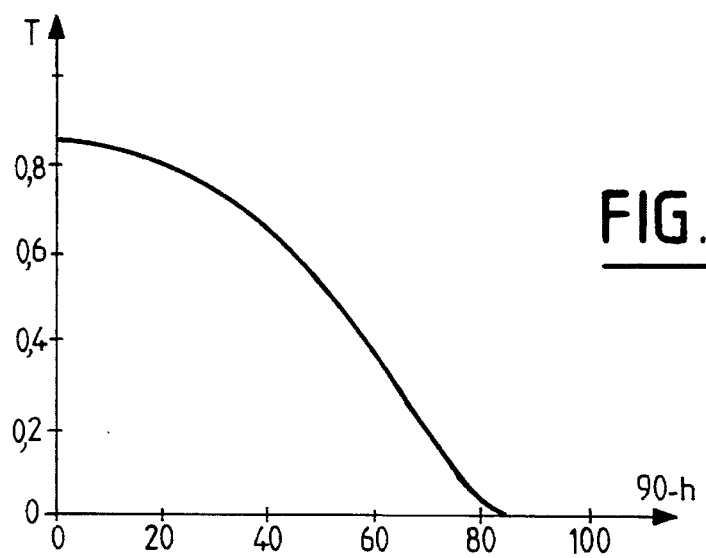
FIG. 7 is a graph showing how the transmission factor T varies as a function of the angular height h of the incident light flux.

According to an advantageous characteristic of the invention, each pixel 12 delivers a photocurrent that is amplified by a correction factor proportional to the value of the reflection losses that appear on the optical surface of the lens, which value depends on the position of the pixel in the matrix. Thus, as can be seen in FIG. 7, the Fresnel optical losses depend strongly on the angle of incidence of the beam and they are considerable at low angular heights h. To perform this correction, the active area of each cell is adapted, as is the amount of amplification applied to the signal delivered by the cell. Thus, at the edge of the array of detectors (sun low) amplification is greater than at the center (sun at its zenith). In practice, the shaping means 15 amplify the photocurrents delivered by the pixels 12 by varying the ratios of the current mirrors used for duplicating the photocurrents. The shaping means 15 thus deliver, for each pixel 12, a current Ii accurately representative of the intensity of the light signal, insofar as the amplification factor is selected as being dependent on the theoretical optical attenuation due to Fresnel losses, and the same applies to the values of the amplification factors for the adjacent pixels 12 belonging to the light spot 4. The intensity of the light spot is thus measured independently of the angle of incidence of the light beam. It should be observed that the amplified and corrected currents Ii are injected to an overall node so that their sum can deliver a signal Vi that determines the intensity of the light spot 4.

According to an advantageous characteristic of the invention, the device 14 includes means enabling the effects of reflected parasitic light to be eliminated. A portion of the incident spot 4 is, in practice, reflected, thereby disturbing the computation of its geometrical center. However, it should be considered that cells illuminated directly by the light spot, i.e. without parasitic reflection, receive much greater light intensity than do any other cells. To eliminate the effects of parasitic reflections, the processor device 14 includes means for defining a variable threshold for the signals delivered by the cells 11 so that the number of pixels delivering a signal that exceeds said threshold value remains constant under all circumstances. The threshold thus adapts itself continuously to guarantee that the number of pixels taken into account when calculating the position of the geometrical center of a spot is constant and always less than the number of pixels actually illuminated by the incident spot.

According to another characteristic of the invention, the processor device 14 includes means making it possible to distinguish the presence of a spot obtained from a localized light source from diffuse illumination. If the light source is the sun, for example, then the output signals from the sensor can take arbitrary values when the sun is not genuinely visible, e.g. because of cloudy or dark sky, or because of an obstacle. In an embodiment, the presence of a light spot 4 is detected by comparing the intensity of the light signal Vi with an adjustable given threshold. Insofar as direct light from the sun is considerably more intense than most other sources that may be encountered, the sun is considered as being visible so long as the measured threshold exceeds the selected threshold value.

Figure 8:
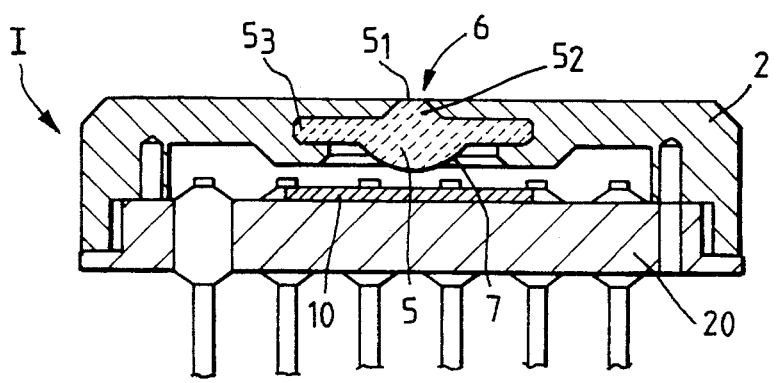
FIG. 8 is a section view through an embodiment of an optoelectronic sensor of the invention.

FIG. 8 shows a preferred variant embodiment of the sensor I of the invention implemented in the form of a compact and sealed package. The sensor I has a body 2 constituting an opaque cover that is also intended to serve as a support for the optical lens 5. According to an advantageous characteristic, the lens 5 has an inlet face 6 which is constituted by the small base $5_1$ of a truncated cone $5_2$ whose large base is connected to a middle portion $5_3$ of the lens, which middle portion constitutes a radial extension relative to the spherical cap 7. The lens 5 is intended to be mounted inside the opaque support 2 so that the small base $5_1$ of the cone $5_2$ lies flush with the top face of the support 2. Such a disposition offers the advantage of avoiding the appearance of a shadow effect at the inlet face of the lens, which shadow effect would otherwise occur at low elevations of the sun. To improve transmission, an antireflection layer may be applied to the inlet face 6 of the lens.

In a variant embodiment, the lens 5 is mounted directly in the support 2 by means of its radial extension $5_3$ snap-fastening in a complementary housing formed in the support 2. In another variant embodiment, the opaque support 2 is made out of injected plastics material and the lens 5 is formed therein subsequently by injection. This variant embodiment avoids mounting the lens inside its support and reduces errors of alignment for the lens relative to the retina 10.

It should be observed that the inside face of the support 2 may be adapted or treated to perform an antireflection function so as to reduce parasitic reflections. The support 2 is fixed by any appropriate means, that may be sealing or otherwise, to a base 20 having the artificial retina 10 fixed therein, e.g. by adhesive.

The invention is not limited to the examples described and shown, and various modifications can be applied thereto without going beyond the ambit of the invention.

We claim:
1. An optoelectronic sensor for measuring the intensity and the direction of incidence of a light beam, the sensor being of the type comprising:

a matrix of pixels each including a photosensitive cell, the pixels being organized substantially in a plane so as to constitute an artificial retina;

an optical system designed to form a light spot on the matrix of pixels; and a signal processor device for processing the signals delivered by the pixels under the effect of a light beam and comprising:

means for determining the geometrical center of the light spot on the matrix, the position of which is a function of the direction of incidence of the light beam; and means for determining the intensity of the light beam;

wherein the means for determining the geometrical center of the light spot are constituted by:

two arrays of connections between the pixels of the matrix, said arrays substantially constituting radii and concentric circles, the coordinates of the light spot on the matrix giving an image of the azimuth angle and of the elevation angle of the incident light beam; and circuits associated with the two arrays of connections between pixels respectively for calculating the azimuth coordinate and the elevation coordinate of the incident light beam.

2. A sensor according to claim 1, wherein each photosensitive cell is associated with a correction factor that depends on the value of reflection losses that appear on the optical surface of the lens and the value of which depends on the position of the cell in the matrix, and also on the values of the correction factors for the adjacent cells belonging to the light spot.

3. A sensor according to claim 1, wherein the signal processor device includes means for defining a variable threshold for the signals so that the number of cells delivering a signal and reaching said threshold remains constant.

4. A sensor according to claim 1, wherein the signal processor device includes means for distinguishing between the presence of a light spot obtained from a light source, and of a light spot obtained from diffuse illumination.

5. A sensor according to claim 2, wherein the correction factors are constituted by matching the active surface area of each cell and/or by a weighting operation applied to the current delivered by each cell.

6. A sensor according to claim 1, wherein the optical system is constituted by:

a lens having a spherical cap facing towards and situated at a distance from the matrix so that the matrix is placed between the lens and its focal plane; and a diaphragm limiting the inlet aperture of the lens through which the incident light beam passes.

7. A sensor according to claim 6, wherein the diaphragm is made by means of a hole formed through an opaque support and occupied by the small base of a truncated cone formed on the face of the lens opposite from that carrying the spherical cap, the small base of the truncated cone forming the inlet face of the lens.

8. A sensor according to claim 7, wherein the lens includes, between the truncated cone and the spherical cap, a middle portion that projects outwards and is connected to the opaque support.

9. A sensor according to claim 7, wherein the inside face of the support is adapted to perform an antireflection function, so as to reduce parasitic reflections.

10. A sensor according to claim 7, wherein the inlet face of the lens is provided with an antireflection layer.

11. A sensor according to claim 7, wherein the opaque support is made by injection, and the lens is likewise made by injection inside the opaque support.

* * * * *